United States Patent [19]

Schaible et al.

[11] Patent Number: 5,064,219
[45] Date of Patent: Nov. 12, 1991

[54] ARRANGEMENT FOR LOCKING AN ADJUSTABLE SAFETY STEERING COLUMN FOR MOTOR VEHICLES

[75] Inventors: Walter Schaible, Hemmingen; Franz-Rudolf Wierschem, Weissach, both of Fed. Rep. of Germany

[73] Assignee: Dr. Ing. h.c.F. Porsche AG, Fed. Rep. of Germany

[21] Appl. No.: 562,603

[22] Filed: Aug. 3, 1990

[30] Foreign Application Priority Data

Aug. 3, 1989 [DE] Fed. Rep. of Germany ....... 3925706

[51] Int. Cl.[5] .............................................. B62D 1/18
[52] U.S. Cl. ......................................... 280/775; 74/493
[58] Field of Search ........................... 280/775; 74/493

[56] References Cited

U.S. PATENT DOCUMENTS

| 3,803,939 | 4/1974 | Schenten | 280/775 |
| 4,244,237 | 1/1981 | Sprunger | 74/493 |
| 4,657,281 | 4/1987 | Haldric et al. | 280/775 |

FOREIGN PATENT DOCUMENTS

| 38806 | 3/1989 | Austria . |
| 0335397 | 10/1989 | European Pat. Off. . |
| 902586 | 1/1954 | Fed. Rep. of Germany . |
| 2430604 | 1/1976 | Fed. Rep. of Germany . |
| 3308788 | 9/1983 | Fed. Rep. of Germany . |
| 2579159 | 9/1986 | France . |
| 1523638 | 9/1978 | United Kingdom . |

Primary Examiner—Kenneth R. Rice
Attorney, Agent, or Firm—Evenson, Wands, Edwards, Lenahan & McKeown

[57] ABSTRACT

An arrangement for locking an adjustable safety steering column for motor vehicles that is arranged to be tiltable and lockable with respect to the vehicle body, has consoles coupled to the vehicle body with guiding slots arranged approximately in a vertical plane, the steering column being tiltable between these consoles. An operating lever of the arrangement has an operating rod. An adjustable clamping device locks the safety column with respect to the vehicle body, and includes an eccentric element arranged in parallel to the axis of the steering column and axially on this operating rod. A pull rod has an end side receiving device in which a free end of the operating rod is pivoted, said pull rod extending transversely with respect to the axis of the steering column through the guiding slots. This allows the steering column to be easily adjusted by simply turning the operating rod.

8 Claims, 4 Drawing Sheets

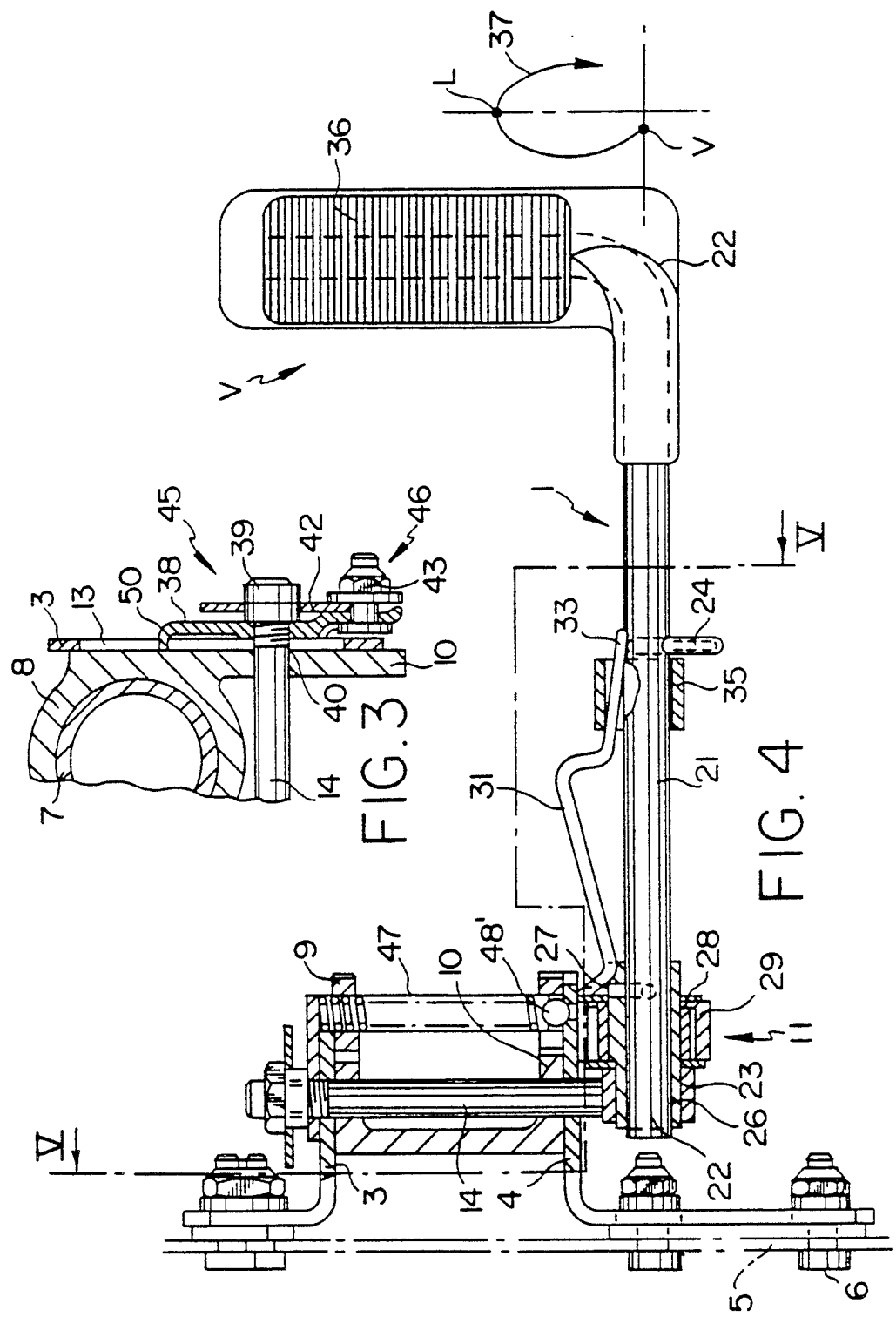

ARRANGEMENT FOR LOCKING AN ADJUSTABLE SAFETY STEERING COLUMN FOR MOTOR VEHICLES

BACKGROUND AND SUMMARY OF THE INVENTION

The present invention relates to an arrangement for locking an adjustable safety steering column for motor vehicles which is arranged so that it can be tilted between consoles of the vehicle body in slotted guides, and can be locked with respect to the vehicle body by an adjustable clamping device and pull rod.

From German Patent 902 586, a locking system is known for a tilt steering column for motor vehicles which comprises a clamping device having a pull rod which holds the steering column between two consoles fixed to the vehicle body. For the fixing of the column via a lever, this device requires a relatively large lever pivot path. As a result of the friction disks and the multiple consoles, this device is expensive with respect to its construction and with respect to its mounting. In addition, a clamping device for tiltable steering columns is also known from Great Britain Patent 15 23 638 which, in order to achieve the clamping, has an eccentric element on a lever which is swivelled to the outside for the locking and thus requires a relatively large amount of clearance space for its operation.

An object of the present invention is to provide an arrangement for the locking of an adjustable safety steering column which, while it has short adjusting paths, permits an optimal clamping effect and has a simple compact construction. In addition, in the event of a crash, the arrangement should release the existing locking of the steering column at the vehicle body.

This and other objects are achieved by the present invention which provides an arrangement for locking an adjustable safety steering column for motor vehicles that is arranged to be tiltable and lockable with respect to the vehicle body. The arrangement comprises consoles coupled to the vehicle body which have guiding slots arranged approximately in a vertical plane, the steering column being tiltable between these consoles. An operating lever of the arrangement has an operating rod, while an adjustable clamping device locks the safety column with respect to the vehicle body, and includes an eccentric element arranged in parallel to the axis of the steering column and axially on the operating rod. The arrangement also includes a pull rod having an end side receiving device in which a free end of the operating rod is pivoted, this pull rod extending transversely with respect to the axis of the steering column through said guiding slots.

The present invention has the advantage of having relatively few components which can be manufactured inexpensively and which partially can be mounted to the vehicle body in a preassembled state.

For achieving a locked position or a released position of the steering column in the vehicle, an eccentric element at an operating rod with a handle is used, the operating rod being arranged in parallel to the axis of the steering column and serving both positions by a swivelling of approximately 90°. As a result, an arrangement of the operating rod with respect to the steering column is achieved that is advantageous in achieving a favorable operating position while occupying relatively little space.

The end positions are fixed by stops of a spring so that the locked position as well as the released position are always maintained which contributes to the safety of the adjustment as well as of the clamping position. The returning of the rod of the clamping device from the released position to the locked position is promoted by the stop spring.

A safety device at the end of the clamping bolt provides an unlocking of the steering column in the event of a crash. This unlocking is caused in such a manner that when the steering column is shifted in the driving direction, for example, in the event of a crash as a result of an occupant's impacting on the steering wheel equipped with an airbag, the clamping effect is released in order to permit displacement of the steering system that is as free of lateral forces as possible.

In an embodiment of the present invention, a ball bearing is arranged on the eccentric sleeve to ensure a smooth release of the clamping as well as a smooth locking since the ball bearing can roll on the eccentric sleeve.

The size of the eccentricity defines the clamping effect so that, when the clamping effect is maximal, the largest eccentricity of the sleeve part is directed to the adjacent console.

So that it is possible to hold the steering column during the tilting, a spring-loaded detent pin is provided which, while the driver tilts the steering column into the desired position, holds the steering column for the purpose of locking.

Other objects, advantages and novel features of the present invention will become apparent from the following detailed description of the invention when considered in conjunction with the accompanying drawings.

BRIEF DESCRIPTION OF THE DRAWINGS

FIG. 3 is a sectional view according to Line III—III of FIG. 1.

FIG. 4 is a sectional view according to Line IV—IV of FIG. 1.

DETAILED DESCRIPTION OF THE DRAWINGS

Figure 1:
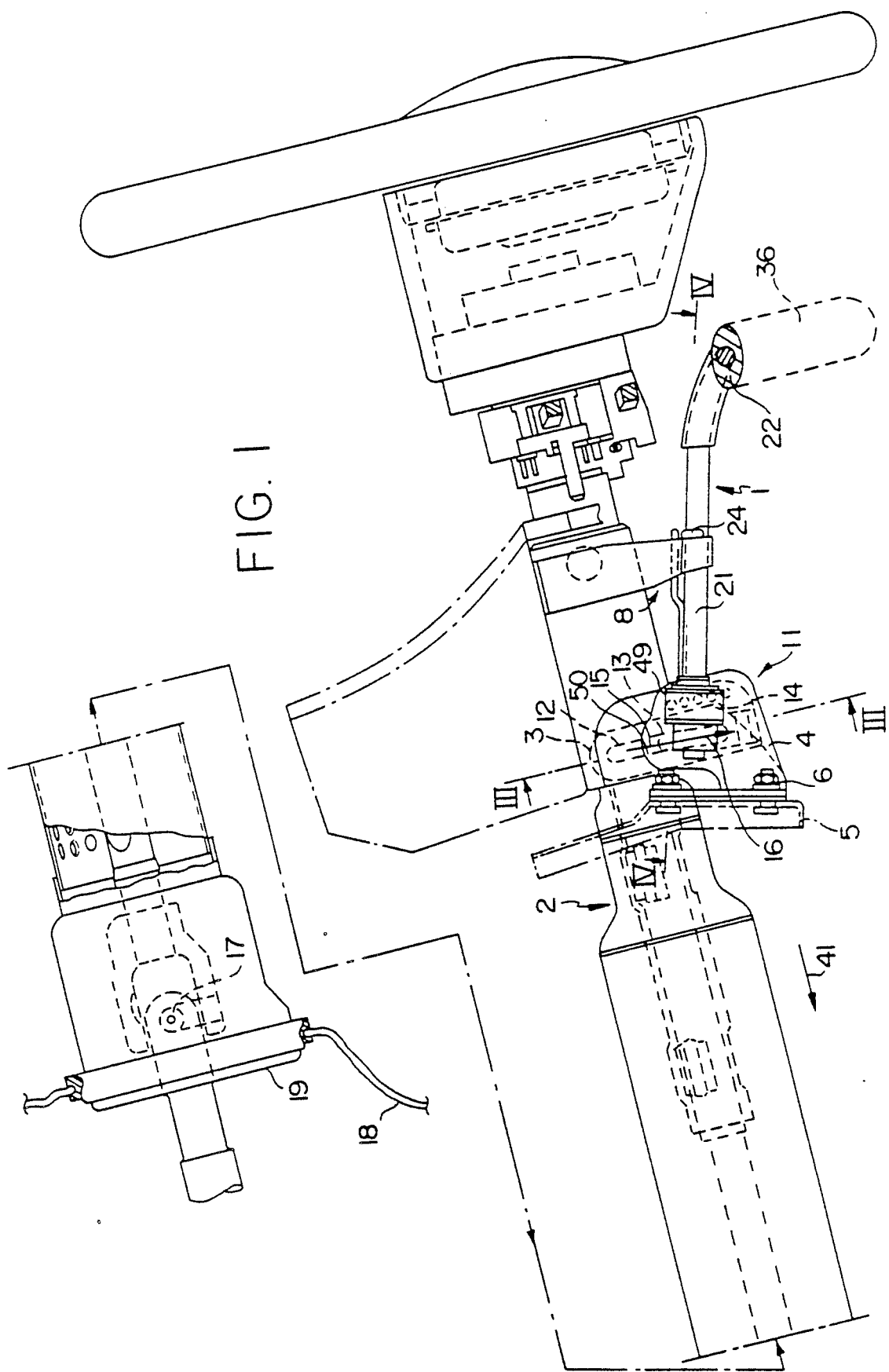
FIG. 1 is a lateral view of an adjustable safety steering column having a locking device constructed in accordance with an embodiment of the present invention.
Figure 2:
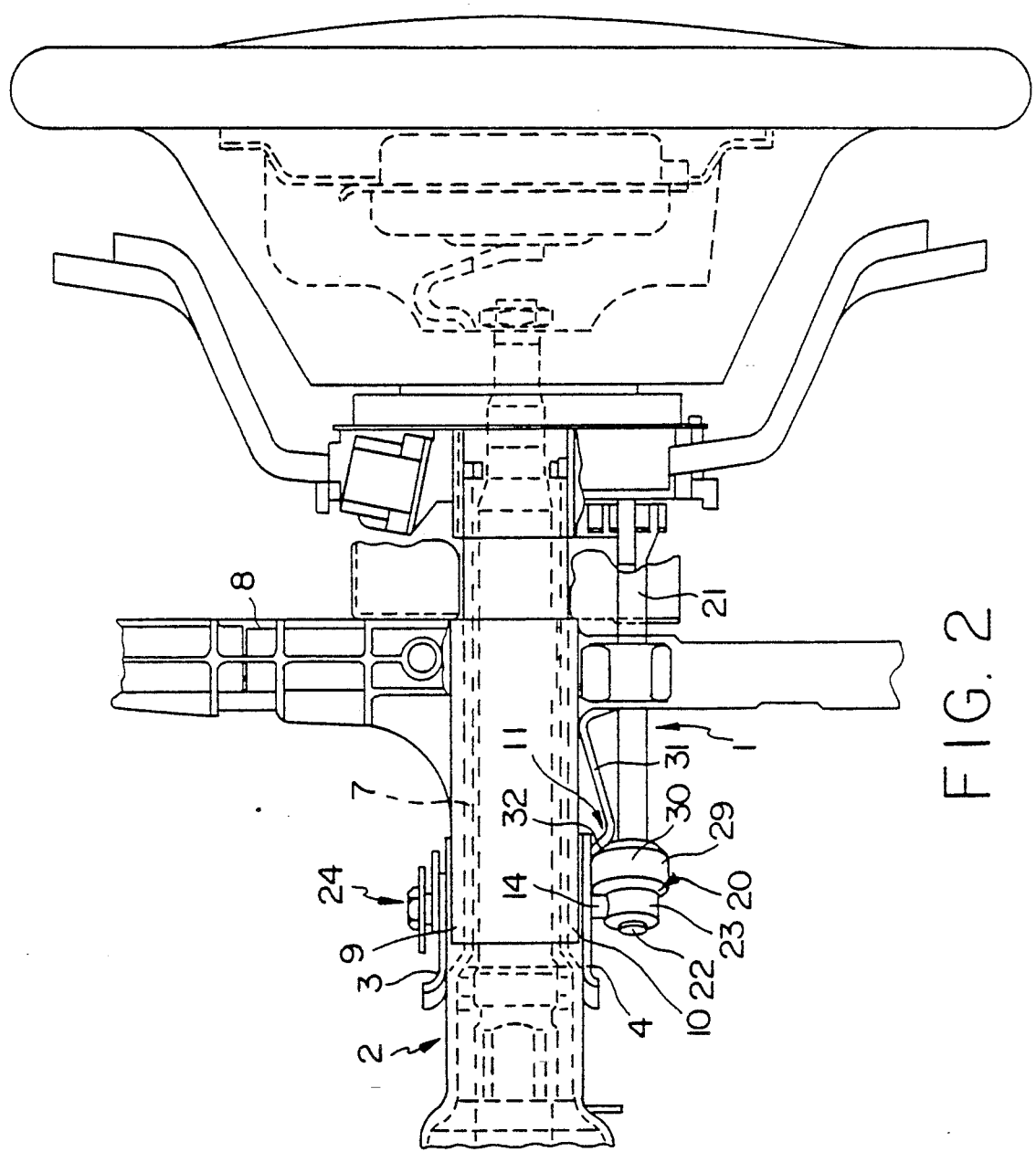
FIG. 2 is a top view of FIG. 1.

The locking arrangement 1 for a steering column 2, as shown in FIGS. 1 and 2, comprises a holding device having two consoles 3 and 4 which are fastened to the vehicle body 5 by means of bolts 6. Between the two consoles 3 and 4, the steering column 2 is arranged with its protective tube 7 (FIG. 2) which is fastened in a cross-member 8 that carries a steering wheel lock and indicators. In the area of the consoles 3 and 4 fixed to the vehicle body 5, this cross-member 8 has legs 9 and 10 which are aligned in parallel and perpendicularly. The legs 9 and 10 are held clamped between the consoles 3 and 4 by means of a clamping device 11, and are fixed with respect to the vehicle body 5.

The consoles 3 and 4 have guide slots 12 and 13 which are aligned approximately in a vertical plane Y-Y and form a guide for a pull rod 14 which is held in the legs 9 and 10 of the cross-member 8. The pull rod 14 permits a tilting of the steering column 2 in the direction of the arrows 15 and 16 around a hinge point 17 or around the pot 19 of the steering column 2 which is held in the body panel 18.

The clamping device 11 comprises an eccentric element 20 that is arranged in parallel to the axis of the steering column 2 and is axially mounted on an operating rod 21 of an operating lever. With a free end 22, this operating rod 21 is pivoted in an end side receiving device 23 of the pull rod 14 which extends transversely with respect to the steering column 2 through the slots 12 and 13. The pull rod 14, with its end facing away from the receiving device 23, is held at the console 3 by a safety device 45 and adjusting device 46 (FIG. 3).

As best seen in FIG. 4, the eccentric element 20 comprises a sleeve 26 which is coupled with the operating rod 21 and has an eccentric sleeve part 27 onto which a cylindrical steel sleeve 28 is pressed. This steel sleeve 28 carries a ball bearing 29 which supports itself at the console 4 by means of the circumferential surface 30 (FIG. 1).

The sleeve 26 is fastened to the rod 21 by a stop spring 31 (FIGS. 2 and 4) which has a projecting stop part 32 adjacent to the ball bearing 29 for a locked position V and a stop leg 33 for a released position L adjacent to a locking pin 24 arranged radially in the rod 21. By means of its stop leg 33, the stop spring 31 is held in a receiving element 35 of the cross-member 8 so that, when the operating rod 21 is turned by the handle 36, a certain restoring force is achieved by this stop spring 31.

Figure 5:
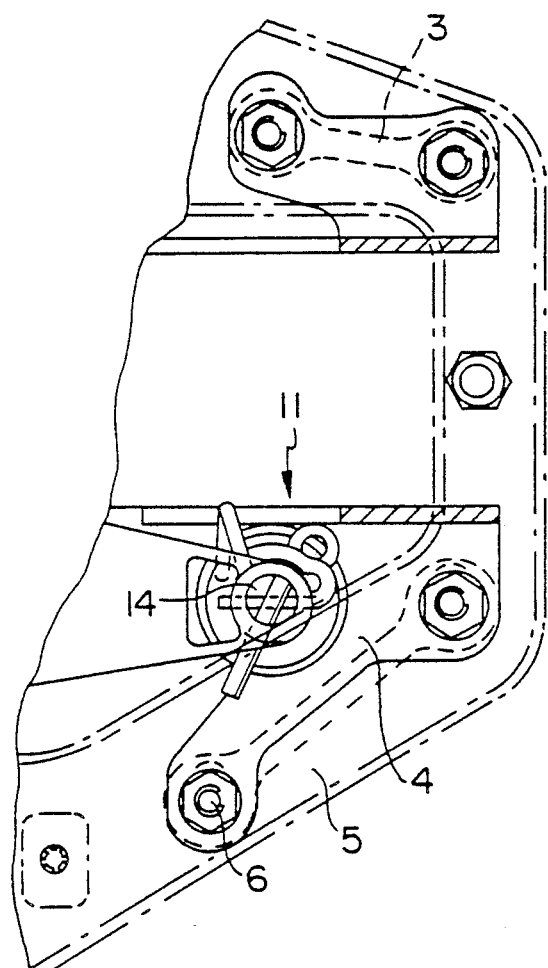
FIG. 5 is a sectional view according to Line V—V of FIG. 4.

The operating rod 21 of the clamping device 11 is turned from the locked position V, by way of the released position L, by approximately 90°. In the locked position V, as shown in FIG. 5, the stop part 32 places itself against the outer surface of the console 4, and a further turning with a subsequent release of the clamping device is therefore no longer possible. When the rod 21 is turned in the direction of the arrow 37 (FIG. 4), the locking pin 24 strikes against the stop leg 33 in the maximal released position L, so that a further turning is prevented.

At its free end facing away from the receiving device 23, the pull rod 14 has a safety device 45 which forms a constructional unit with the adjusting device 46. This safety device 45 comprises a supporting plate 38 (FIG. 3) which, by way of a bending 50 is guided in the slot 13 of the console 3. The pull rod 14 extends through the supporting plate 38 and is held by a coarse thread 40 on the pull rod 14 by a nut 39. Thus, when the steering system is moved in the direction of the arrow 41 (FIG. 1) as a result of a crash, the steering column 2 or the body panel to which the consoles 3 and 4 are fastened is released by the nut 39 detaching from the pull rod 21. The clamping effect by the eccentric element 20 is released, and the steering column 2 can move relatively freely. A disk 42 which can be braced by a screw 43 against the supporting plate 38, is connected with the nut 39, whereby a defined prestressing of the safety device 45 is achieved.

As shown in detail in FIG. 4, when the operating rod 21 is swivelled in the direction of the arrow 37 by means of the handle 36, the eccentric element 20 is released from its locked position V from the console 3, 4. In the released position L, the stop leg 33 of the spring 31 strikes against the locking pin 24 and delimits the swivel motion in the direction of the arrow 37. The released position L has been reached after a swivel motion of approximately 90° and the eccentric element 20 is detached from the console 4. In this L-position, the handle 36, as outlined by interrupted lines in FIG. 1, points approximately vertically downward, whereas, in the locked position V, the handle 36 is displaced in a horizontal plane.

When the released position L is reached, the steering column 2 with the cross-member 8 can be tilted in the direction of the arrows 15 and 16. In this case, by means of a detent pin 47 having a spring-loaded ball 48 at its end which engages in bores 49 of the console 4, an instantaneous holding of the adjusted tilt position of the steering column 2 is possible. After the adjustment of the desired position of the steering column 2, a locking takes place via the eccentric element 20 by rotating the operating rod 21 with the handle 36 against the direction of the arrow 37.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for locking an adjustable safety steering column for motor vehicles that is arranged to be tiltable and lockable with respect to the vehicle body, comprising:
    consoles coupled to the vehicle body and having guiding slots arranged approximately in a vertical plane, the steering column being tiltable between said consoles;
    an operating lever having an operating rod;
    an adjustable clamping device which locks the safety column with respect to the vehicle body, and including an eccentric element arranged in parallel to the axis of the steering column and axially on said rod;
    a pull rod having an end side receiving device in which a free end of the operating rod is pivoted, said pull rod extending transversely with respect to the axis of the steering column through said guiding slots.

2. An arrangement according to claim 1, wherein the eccentric element has a sleeve with an eccentric sleeve part that is coupled with a cylindrical steel sleeve, said cylindrical sleeve supporting a rotatable ball bearing with a circumferential surface that rests against one of the consoles.

3. An arrangement according to claim 2, wherein the operating rod includes a radially arranged locking pin and further comprising a stop spring that couples the sleeve with the operating rod, said stop spring having a projecting stop part movable to a locked position adjacent to the ball bearing and a stop leg movable to a released position in the area of the radially arranged locking pin.

4. An arrangement according to claim 3, wherein the steering column has a cross-member with a receiving element and the stop spring is arranged between one of the consoles and the operating rod with the free end of said stop leg being held in said receiving element.

5. An arrangement according to claim 3, wherein the clamping device has a rotating range of approximately 90° from the locked position to the released position, with the stop part of the stop spring in the locked position supporting itself on an outer surface of one of the consoles and, in the released position, the stop leg resting against the locking pin.

6. An arrangement according to claim 1, further comprising a safety device coupled to a free end of the pull rod facing away from the receiving device of the pull rod, said safety device including a supporting plate guided in the guiding slot of one of the consoles and an adjusting device coupled with the supporting plate.

7. An arrangement according to claim 6, further comprising a nut fastened on a coarse thread of the pull rod for coupling the pull rod with the console, an overlapping disk carried by the nut, and an adjusting screw that couples the overlapping disk with the supporting plate.

8. An arrangement according to claim 1, further comprising a detent pin arranged between the consoles which elastically holds the tilt positions of the steering column, said cross-member having a leg, and one of the consoles having bores, said detent pin having first and second ends, with the first end fixedly having an elastic ball element arranged in said cross-member leg and the second end engaging in said bores of the console.

* * * * *